US010530768B2

(12) United States Patent
Shteingart et al.

(10) Patent No.: US 10,530,768 B2
(45) Date of Patent: Jan. 7, 2020

(54) TWO-FACTOR AUTHENTICATION

(71) Applicant: MICROSOFT TECHNOLOGY LICENSING, LLC, Redmond, WA (US)

(72) Inventors: Hanan Shteingart, Herzliya (IL); Ariel N. Gordon, Kirkland, WA (US); Jonathan Gazit, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 148 days.

(21) Appl. No.: 15/132,657

(22) Filed: Apr. 19, 2016

(65) Prior Publication Data
US 2017/0302659 A1 Oct. 19, 2017

(51) Int. Cl.
H04L 29/06 (2006.01)
H04W 12/00 (2009.01)
(Continued)

(52) U.S. Cl.
CPC .......... *H04L 63/0853* (2013.01); *H04L 63/10* (2013.01); *H04W 4/50* (2018.02);
(Continued)

(58) Field of Classification Search
CPC ..... H04L 29/06; H04L 63/0853; H04L 63/10; H04L 2463/082; H04W 12/06; H04W 12/08; H04W 12/00503
See application file for complete search history.

(56) References Cited

U.S. PATENT DOCUMENTS 8,683,562 B2 3/2014 Ting et al.
8,811,685 B1 8/2014 Bowers et al.
(Continued)

FOREIGN PATENT DOCUMENTS

WO 2014209322 A1 12/2014

OTHER PUBLICATIONS

"International Search Report and Written Opinion Issued in PCT Application No. PCT/US2017/027083", dated Jun. 30, 2017, 12 Pages.
(Continued)

*Primary Examiner* — Daniel B Potratz
*Assistant Examiner* — Vu V Tran
(74) *Attorney, Agent, or Firm* — Shook, Hardy and Bacon, L.L.P.

(57) ABSTRACT

Systems, methods, and computer-readable storage media are provided for authenticating users to secure services or apps utilizing reversed, hands-free and/or continuous two-factor authentication. When a user desires to access a secure service or app for which s/he is already registered, the user, having a registered mobile computing device in proximity to his or her presence, comes within a threshold distance of a computing device that includes the desired secure service or app. The computing device authenticates the particular mobile computing device as associated with the particular registered user that utilized that mobile device during registration. Subsequent to such device authentication, the user is able to login to the service or app by simply providing his or her user credentials at a login form associated therewith. Two-factor authentication in accordance with embodiments hereof is more secure and more efficient that traditional authentication methodologies.

20 Claims, 5 Drawing Sheets

(51) Int. Cl.
  *H04W 12/06* (2009.01)
  *H04W 12/08* (2009.01)
  *H04W 4/50* (2018.01)
  *H04W 4/80* (2018.01)

(52) U.S. Cl.
  CPC ............ *H04W 4/80* (2018.02); *H04W 12/06* (2013.01); *H04W 12/08* (2013.01)

(56) References Cited

U.S. PATENT DOCUMENTS

| | | |
|---|---|---|
| 8,875,232 B2 | 10/2014 | Blom et al. |
| 8,984,276 B2 | 3/2015 | Benson et al. |
| 9,075,979 B1 | 7/2015 | Queru |
| 9,104,853 B2 | 8/2015 | Mathur et al. |
| 2007/0094715 A1 | 4/2007 | Brown et al. |
| 2008/0289030 A1 | 11/2008 | Poplett |
| 2009/0172812 A1 | 7/2009 | Mercredi |
| 2010/0193585 A1 | 8/2010 | Salyards et al. |
| 2013/0237155 A1 | 9/2013 | Kim |
| 2013/0251216 A1 | 9/2013 | Smowton et al. |
| 2014/0157381 A1* | 6/2014 | Disraeli ................ G06F 21/31 726/7 |
| 2014/0181938 A1* | 6/2014 | Hrybyk ............ H04L 27/2003 726/7 |
| 2014/0181955 A1 | 6/2014 | Rosati |
| 2014/0282877 A1* | 9/2014 | Mahaffey ........... H04L 63/0853 726/3 |
| 2014/0282927 A1 | 9/2014 | Mclaughlin et al. |
| 2015/0188891 A1* | 7/2015 | Grange .................. H04L 63/06 380/270 |
| 2015/0215299 A1 | 7/2015 | Burch et al. |
| 2016/0285633 A1* | 9/2016 | Allinson ................ G06F 21/34 |
| 2016/0306955 A1* | 10/2016 | Martin .................... G06F 21/34 |

OTHER PUBLICATIONS

Barton, Blain, "Azure Multi-Factor Authentication and Identity, Step-by-step", published Mar. 26, 2015; http://blogs.technet.com/b/blainbar/archive/2015/03/26/azure-multi-factor-authentication-and-identity-step-by-step.aspx; 15 pages.

Kaviani, et al., "A Two-factor Authentication Mechanism Using Mobile Phones", In Technical report of LERSSE-TR-2008-03, Aug. 20, 2008, pp. 1-27.

Graham, Keith, "Moving Beyond 2-Factor Authentication With 'Context'", Published on: Dec. 5, 2014; http://www.darkreading.com/endpoint/authentication/moving-beyond-2-factor-authentication-with-context/a/d-d/1317911, 14 pages.

Jarva, Olli, "Intelligent two-factor authentication—Deciding authentication requirements using historical context data", In Master Thesis of School of Science, May 13, 2014, 116 pages.

"Google 2-Step Verification", retrieved on Sep. 8, 2015; https://www.google.com/landing/2step/; 5 pages.

"Microsoft IT Phone Authentication", Retrieved on: Sep. 8, 2015; https://phoneregistration.microsoft.com/; 1 page.

"FIDO Alliance", retrieved on Sep. 8, 2015; https://fidoalliance.org/; 1 page.

* cited by examiner

TWO-FACTOR AUTHENTICATION

BACKGROUND

When a user desire to access a secured service or app (for instance, via a website or app program), s/he often is required to register for the service or app. During registration, the user selects, creates, or is otherwise provided with one or more user credentials that serve to identify the user. Upon accessing the service or app on occasions subsequent to the initial registration, the user is authenticated to the service or app by providing the user credentials that verify his/her identity. This type of registration generally is referred to as single-factor authentication as the user is required to authenticate to the service or app utilizing a single factor— "something that the user knows" (i.e., the password that was selected, created, or otherwise provided upon registration).

While single-factor authentication is sufficient for certain objectives, deceitful users employing a little creativity and knowledge of the user, may be able to guess the user credentials and fraudulently utilize the service or app via the user's registered account. Accordingly, a stronger authentication often is desired. Authentication based on two factors (generally referred to as "two-factor authentication") commonly is considered in the art to be a "strong" authentication. Potential authentication factors include "something the user knows" (for instance, a user-generated password), "something the user has" (for instance, a smart card) and "something the user is" (for instance, biometric properties specific to the user). Traditional two-factor authentication instructs a user, at a login form (for instance, at a text box having fields for receiving alpha-numeric input) to enter user credentials (e.g., a user name and password) selected, created or otherwise provided at registration as the first authentication factor (as described above). However, with two-factor authentication, after verifying his or her identity utilizing the first factor, the user is transmitted a code (e.g., a numeric code) via email, Short Messaging Service (SMS), or the like. The user generally then is required to manually input the code into the login form. This code transmission and entering process represents the second authentication factor.

While more secure than single-factor authentication, this above-described process is cumbersome for users, particularly those with physical disabilities that render manual input of textual information difficult. Further, the above-described process requires extensive manual user intervention each time the user seeks to authenticate to the service or app. Still further, once both factors are authenticated to the service or app, the service or app may remain in an accessed state leaving the service or app vulnerable to opportunistic fraudulent users that attempt to access the user's computing device, for instance, when the user steps away without shutting down or otherwise rendering dormant, the service or app.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer-readable storage media are provided for authenticating a user to a service or app utilizing reversed, hands-free and/or continuous two-factor authentication. When a user registers for a particular service or app, a secure knowledge item is provided to the user and the user is instructed to input the secure knowledge item in association with the registration form utilizing a particular mobile computing device (e.g., a mobile telephone, a tablet, a laptop PC, a smart band or watch, etc.) that the user routinely will have in proximity to his or her presence when subsequently utilizing the service or app. When the user enters the code as instructed, the code is verified with the registration service as associated with the user to whom the code was provided and one more identifying details associated with the mobile device from which the code was received are stored as authentication credentials; credentials that may be used to authenticate the particular mobile device as associated with the registering user at a later instance in time.

Subsequently, when the user desires to access the service or app for which he or she is already registered, the user, having the mobile computing device in proximity to his or her presence, comes within a threshold distance of a computing device that includes the service or app. The computing device authenticates the particular mobile computing device by the device authentication credentials as associated with the particular registered user that utilized that mobile device at registration. Subsequent to such device authentication, the user is able to login to the service or app by simply providing his or her user credentials at a login form associated therewith.

Embodiments hereof provide for reversed, hands-free, and/or continuous two-factor authentication that is more secure and more efficient than traditional two-factor authentication. Utilizing embodiments of the present technology, the cumbersome nature of two-factor authentication is reduced as mobile device authentication can happen without any user intervention and/or even knowledge of the user. Further, the service or app is less vulnerable to opportunistic fraudulent users that attempt to access the user's computing device as the service or app may automatically shut down or otherwise be rendered dormant when the mobile device is no longer detected to be within a threshold proximity of the computing device from which the service or app is being accessed utilizing the user credentials.

BRIEF DESCRIPTION OF THE DRAWINGS

The present invention is illustrated by way of example and not limitation in the accompanying figures in which like reference numerals indicate similar elements and in which.

DETAILED DESCRIPTION

The technology of the present application is described with specificity herein to meet statutory requirements. However, the description itself is not intended to limit the scope of this patent application. Rather, the inventors have contemplated that the claimed subject matter also might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein generally are directed to systems, methods, and computer-readable storage media for authenticating a user to a service or app utilizing reversed, hands-free and/or continuous two-factor authentication. Upon registration for a particular service or app, a secure knowledge item (for instance, a numeric code, a QR code, or the like) is provided to the registering user and the user is instructed to input the secure knowledge item in association with the registration form utilizing a particular mobile computing device (e.g., a mobile telephone, a tablet, a laptop PC, a smart band or watch, etc.) that the user routinely will have in proximity to his or her presence when subsequently utilizing the service or app. When the user enters the code as instructed, the code is verified with the registration service as associated with the user to whom the code was provided and one more identifying details associated with the mobile device from which the code was received are stored as authentication credentials; credentials that may be used to authenticate the particular mobile device as associated with the registering user at a later instance in time.

Subsequently, when the user desires to access the service or app for which he or she is already registered, the user, and the mobile computing device which the user has in proximity to his or her presence, comes within a threshold distance of a computing device that includes the service or app (such computing device may or may not be the same device from which the user registered with the app or service). The computing device authenticates the particular mobile computing device by the device authentication credentials as associated with the particular registered user that utilized that mobile device at registration. Subsequent to such device authentication, the user is able to login to the service or app by simply providing his or her user credentials at a login form associated therewith.

Accordingly, exemplary embodiments are directed to reverse two-factor authentication systems that comprise a distance detecting component, an authentication credential component, a verification component and an access permitting component. The distance detecting component is configured to detect, at a first time instance, that a first computing device is within a threshold distance of a second computing device, the second computing device including a service or app for which authentication is required. The authentication credential component is configured to determine that the first computing device is associated with at least one device authentication credential (indicating that the first computing device was utilized by a registered user upon registering for access to the service or app), receive the at least one device authentication credential and, after receiving the at least one device authentication credential, receive at least one user credential associated with a user of the second computing device. The verification component is configured to verify that the at least one user credential is associated with the registered user. The access permitting component is configured to permit the user of the second computing device to access the service or app.

In exemplary systems of the present technology, the distance detecting component further may be configured to detect, at a second time instance, that a distance between the first computing device and the second computing device exceeds the threshold distance. In such exemplary systems, the access permitting component further may be configured to, upon the distance detecting component detecting that the distance exceeds the threshold distance, discontinue permitting the second computing device to access the service or app.

Other exemplary embodiments are directed to methods (for instance, being performed by one or more computing devices including at least one processor) for continuous two-factor authentication. Exemplary methods comprise, at a first time instance, detecting that a first computing device is within a threshold distance of a second computing device, the second computing device including a service or app for which authentication is required; permitting a user of the second computing device to access the service or app; at a second time instance, detecting a distance between the first computing device and the second computing device that exceeds the threshold distance; and discontinuing permitting the user of the second computing device to access the service or app.

Exemplary methods further may comprise determining that the first computing device is associated with at least one device authentication credential (indicating that the first computing device was utilized by a registered user upon registering for access to the service or app); receiving the at least one device authentication credential; after receiving the at least one device authentication credential, receiving at least one user credential associated with the user of the second computing device; verifying that the at least one user credential is associated with the registered user; and permitting the user of the second computing device to access the service or app.

Yet other exemplary embodiments are directed to one or more computer-readable storage media storing computer-useable instructions that, when used by one or more computing devices, cause the one or more computing devices to perform a method for hands-free two-factor authentication. Exemplary methods comprise, from a first computing device, automatically and without user intervention, emitting a signal announcing presence for a first service or app for which authentication is required; automatically and without user intervention, receiving an indication that the signal has been received by a second computing device; automatically and without user intervention, authenticating the second computing device as being associated with a registered user of the service or app; receiving at least one user credential; verifying that the at least one user credential is associated with the registered user of the service or app; and permitting the registered user to access the service or app via the first computing device.

Exemplary methods further may comprise, at a second time instance, detecting a distance between the first computing device and the second computing device exceeds the threshold distance; and upon detecting that the distance between the first computing device and the second computing device exceeds the threshold distance, discontinuing permitting the registered user to access the service or app via the first computing device.

Figure 1:
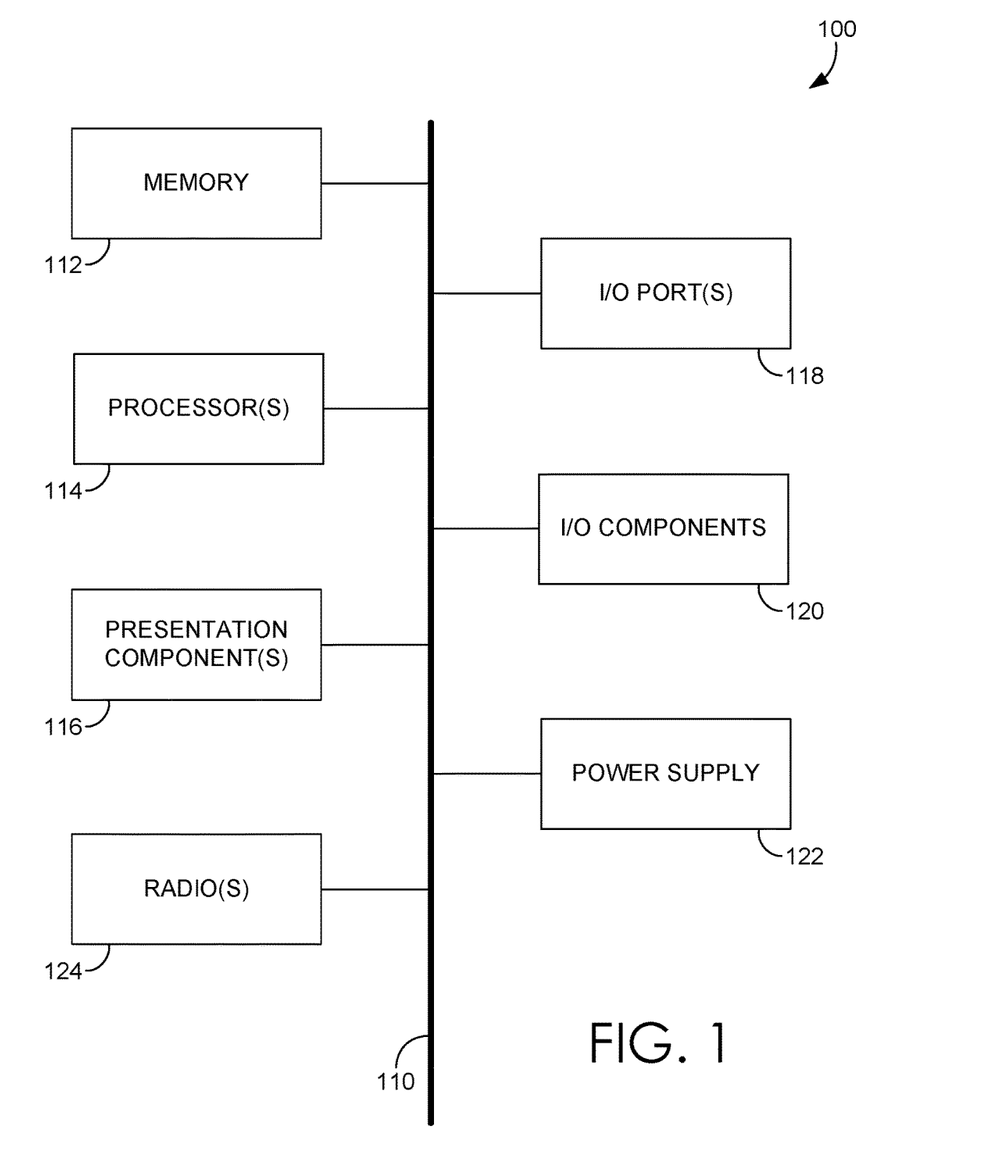
FIG. 1 is a block diagram of an exemplary computing environment suitable for use in implementing embodiments of the present invention.

Referring now to the figures in general and initially to FIG. 1 in particular, an exemplary operating environment for implementing embodiments of the present technology is shown and designated generally as computing device 100. The computing device 100 is but one example of a suitable computing environment and is not intended to suggest any limitation as to the scope of use or functionality of embodiments of the technology. Neither should the computing device 100 be interpreted as having any dependency or requirement relating to any one component nor any combination of components illustrated.

Embodiments of the technology may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the technology may be practiced in a variety of system configurations, including, but not limited to, hand-held devices, consumer electronics, general-purpose computers, more specialty computing devices, and the like. Embodiments of the technology also may be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors 114 that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 114 may be direct or via a coupling utilizing a serial port, parallel port, and/or other interface and/or system bus known in the art. Furthermore, the digitizer input component may be a component separate from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 100. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as stereoscopic camera systems, infrared camera systems, RGB camera systems, and combinations of these, for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

The computing device 100 additionally may include a radio 124. The radio 124 transmits and receives radio communications. The computing device 100 may be a wireless terminal adapted to receive communications and media over various wireless networks. The computing device 100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When referring to "short" and "long" types of connections herein, reference to the spatial relation between two devices is not intended. Instead, short range and long range are generally being referred to as different categories, or types, of connections (i.e., a primary connection and a secondary connection). A short-range connection may include a Wi-Fi® connection to a device (e.g., a mobile hotspot) that provides access to a wireless communications network, such as a WLAN connection using the 802.11 protocol. A Bluetooth® connection to another computing device is a second example of a short-range connection. A long-range connection may include a connection using one or more of CDMA, GPRS, GSM, TDMA, and 802.16 protocols.

Aspects of the subject matter detailed herein may be described in the general context of computer-executable instructions, such as program modules, being executed by an electronic device. Generally, program modules include routines, programs, objects, components, data structures, and so forth, which perform particular tasks or implement particular abstract data types. Aspects of the subject matter described herein also may be practiced in distributed computing environments where tasks are performed by remote processing devices that are linked through a communications network. In a distributed computing environment, program modules may be located in both local and remote computer storage media including memory storage devices. The computer-useable instructions form an interface to allow a computing device to react according to a source of input. The instructions cooperate with other code segments to initiate a variety of tasks in response to data received in conjunction with the source of the received data.

Figure 2:
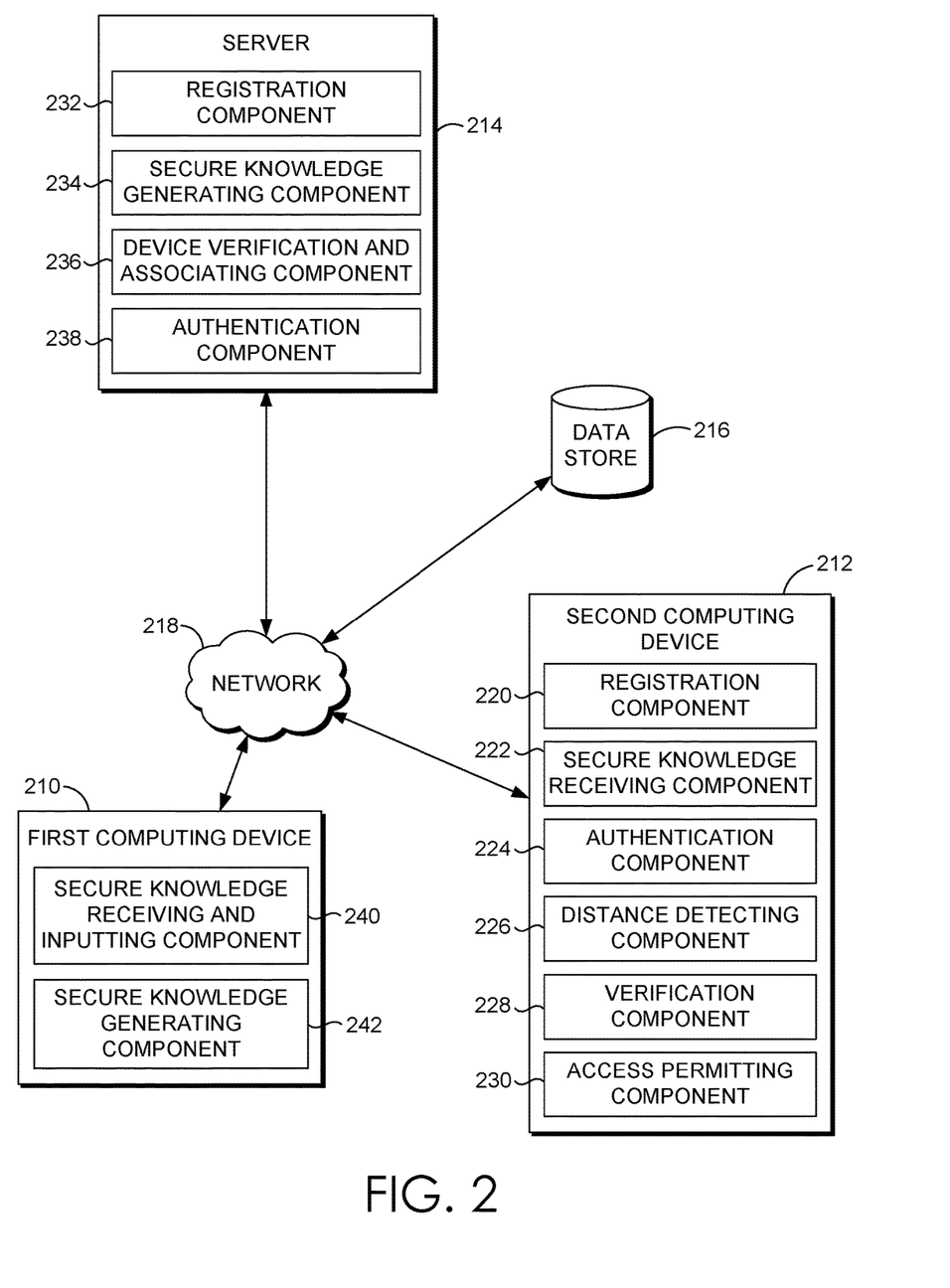
FIG. 2 is a diagram depicting an exemplary computing environment for authenticating a user to a service or app utilizing reversed, hands-free and/or continuous two-factor authentication, in accordance with an aspect of the technology described herein.

As previously set forth, embodiments of the present invention provide systems, methods, and computer-readable storage media for authenticating a user to a service or app utilizing reversed, hands-free and/or continuous two-factor authentication. With reference to FIG. 2, a block diagram is provided illustrating an exemplary computing system 200 in which embodiments of the present technology may be employed. Generally, the computing system 200 illustrates an environment in which users may be authenticated to secured services or apps utilizing one or more of reversed, hands-free, or continuous two-factor authentication, in accordance with the methods, for instance, illustrated in FIGS. 3, 4 and 5 (more fully described below). Among other components not shown, the computing system 200 generally includes a first computing device 210, a second computing device 212, a server 214, and a data store 216, all in communication with one another via a network 218. The network 218 may include, without limitation, one or more local area networks (LANs) and/or wide area networks (WANs). Such networking environments are commonplace in offices, enterprise-wide computer networks, intranets and the Internet. Accordingly, the network 218 is not further described herein.

It should be understood that any number of computing devices 210, 212 and/or servers 214 may be employed in the computing system 200 within the scope of embodiments of the present technology. Each may comprise a single device/interface or multiple devices/interfaces cooperating in a distributed environment. For instance, the server 214 may comprise multiple devices and/or modules arranged in a distributed environment that collectively provide the functionality of the server 214 described herein. Additionally, other components or modules not shown also may be included within the computing system 200.

In some embodiments, one or more of the illustrated components/modules may be implemented as stand-alone applications. In other embodiments, one or more of the illustrated components/modules may be implemented via the server 214 or as an Internet-based service. It will be understood by those having ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of servers 214. By way of example only, the server 214 might be provided as a single computing device, a cluster of computing devices, or a computing device remote from one or more of the remaining components.

It should be understood that this and other arrangements described herein are set forth only as examples. Other arrangements and elements (e.g., machines, interfaces, functions, orders, and groupings of functions) can be used in addition to or instead of those shown and/or described, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The first computing device 210 may include any type of computing device, such as the computing device 100 described with reference to FIG. 1, for example. In exemplary embodiments, the first computing device 210 is a mobile computing device (e.g., a mobile telephone, a tablet computer, a laptop PC, a smart band or watch, or the like) that a user feasibly routinely may have in proximity to his or her presence. In embodiments, the first computing device 210 is associated with a microphone, a speaker and one or more I/O components, such as a stylus or keypad, for permitting alpha-numeric and/or textual input into a designated region (e.g., text box). It should be noted that the functionality described herein as being performed by the first computing device 210 may be performed by any other application, application software, user interface, or the like capable of, at least in part, emitting and receiving presence indicating signals, and receiving and transmitting device authentication codes. It should further be noted that embodiments of the present technology are equally applicable to devices accepting gesture, touch and/or voice input. Any and all such variations, and any combination thereof, are contemplated to be within the scope of embodiments of the present technology.

The second computing device 212 also may include any type of computing device, such as, e.g., the computing device 100 described with reference to FIG. 1. In embodiments, the second computing device 212 is associated with a microphone, a speaker and one or more I/O components, such as a stylus or keypad, for permitting alpha-numeric and/or textual input into a designated region (e.g., text box). It should be noted that the functionality described herein as being performed by the second computing device 212 may be performed by any other application, application software, user interface, or the like capable of registering users, authenticating users and accessing secured services or apps upon a user providing appropriate user credentials and device authentication credentials. It should further be noted that embodiments of the present technology are equally applicable to mobile computing devices and devices accepting gesture, touch and/or voice input. Any and all such variations, and any combination thereof, are contemplated to be within the scope of embodiments of the present technology.

The server 214 of the computing system 200 of FIG. 2 is configured to, among other things, register users to use secure services or apps, and to authenticate registered users of secure services or apps. In this regard, the server 214 has access to the data store 216. In embodiments, the data store 216 is configured to be searchable for one or more of the items stored in association therewith. It will be understood and appreciated by those having ordinary skill in the art that the information stored in association with the data store 216 may be configurable and may include any information relevant to, by way of example only, user credentials, device authentication credentials, threshold proximity distances, and the like. The content and volume of such information are not intended to limit the scope of aspects of the present technology in any way. Further, the data store 216 may be a single, independent component (as shown) or a plurality of storage devices, for instance a database cluster, portions of which may reside in association with the server 214, another external computing device (not shown), and/or any combination thereof. Additionally, the data store 216 may include a plurality of unrelated data stores within the scope of embodiments of the present technology.

In accordance with embodiments of the present technology, a user desiring to access a secure service or app must first register with the secure service or app. Registration in accordance with embodiments hereof requires registration of both the user (resulting in generation of one or more user credentials to be utilized for subsequent login to the secured service or app) and of a mobile computing device that the user routinely has in close proximity to his or her presence (e.g., a mobile telephone, Personal Digital Assistant (PDA), a tablet, a laptop PC, a smart band or watch, or the like). Registration of the mobile computing device results in generation of one or more device authentication credentials to be utilized for subsequent login to the secured service or app.

For purposes of the present description, the first computing device 210 is referenced herein as the mobile computing device and the second computing device 212 is referenced herein as the client device from which registration for and access to the secured service or app will be conducted. It will be understood by those having ordinary skill in the art, however, that the functions described herein as being performed by one or the other of the first and second computing devices 210, 212 are not mutually exclusive. Many of the described functions may be performed by either one or both of the first and second computing devices 210, 212. Any and all such variations, and any combination thereof, are contemplated to be within the scope of embodiments of the present technology.

To initiate registration, the user accesses the appropriate registration form (e.g., an online registration form accessible from a website or app program location that includes one more fields for receiving input of user-identifying information) via the second computing device 212. The registration component 220 of the second computing device 212 issues a registration request to the registration component 232 of the server 214. In conjunction with the registration request, the user may select, create, or otherwise be provided with one or more user credentials (e.g., a user name and password) that will subsequently serve to identify the user and be used to authenticate the user to the secure service or app (as more fully described below). The registration component 232 of the server 214 receives the registration request from the registration component 220 of the second computing device 212 and, in response to receipt of all appropriate information needed for registration, the secure knowledge generating component 234 of the server 214 generates a secure knowledge item (e.g., a numeric code or QR code unique to the user), stores the secure knowledge item (e.g., in association with the data store 216), and transmits the secure knowledge item to the second computing device 212 where it is received by the secure knowledge receiving component 222. Upon receipt of the secure knowledge item, the user is instructed to input the secure knowledge item in association with the registration form utilizing a particular mobile computing device (e.g., a mobile telephone, Personal Digital Assistant (PDA), a tablet, a laptop PC, a smart band or watch, or the like) that the user routinely will have in proximity to his or her presence when subsequently utilizing the service or app.

The user then enters the secure knowledge item as instructed (e.g., by scanning a QR code or inputting a numeric code via alpha-numeric input capabilities) utilizing the secure knowledge receiving and inputting component 240 of the first computing device 210. The secure knowledge receiving and inputting component 240 stores the secure knowledge item and transmits the same to the server 214 for verification. The secure knowledge item is received by the device verification and associating component 236 of the server 214 and device authentication credentials are generated that associated the mobile device (via one or more identifying details associated therewith) with the user credentials and, accordingly, the registered user. Both the user credentials and the device authentication credentials subsequently may be used to authenticate the particular mobile device as associated with the registering user, as more fully described below.

It will be understood and appreciated by those having ordinary skill in the art that a user may register for access to a secure service or app directly from a mobile device. In such instances, utilization of the registration component 220 and secure knowledge receiving component 222 of the second computing device 212 becomes unnecessary and, in embodiments, these components may be eliminated from the second computing device 212 altogether. Additionally, in such instances, the first computing device 210 may include a registration component (not shown) having functionality similar to that of the registration component 220 described herein with respect to the second computing device 212. Any and all such variations and any combination thereof are contemplated to be within the scope of embodiments of the present technology. The particulars illustrated in FIG. 2 are meant by way of illustration only and not limitation.

Once a user and his or her mobile device are registered for access to a desired secure service or app, the registered user may access the secured service or app. Access may be initiated via the user's registered mobile device (e.g., the first computing device 210) or via a client device from which the user desires to access the secure service or app (e.g., the second computing device 212). In the first scenario (wherein access is requested by and initiated by the user's registered mobile device), an authentication request is issued by the authentication component 224 of the second computing device 212, the authentication request including at least one identifying characteristic of the user (e.g., a user name). The initiation request is transmitted from the second computing device 212 to the server 214 wherein it is received by the authentication component 238.

In accordance with embodiments of the present technology, the mobile computing device (e.g., the first computing device 210) may continuously or periodically emit a beacon or signal announcing its presence. As utilized herein, the term "continuously" refers to transmission of a signal at frequent enough time intervals that the mobile computing device 210 is nearly always detectable (for instance, every three seconds or less). As utilized herein, the term "periodically" refers to transmission of a signal at spaced time intervals that are not as frequent as if transmission was continuous but are still at frequent enough intervals that it is unlikely that the server 214 and/or the second computing device 212 will be unaware of the presence of the first computing device 210 for more than a few seconds. By way of example, periodic transmission of a signal may be at any time interval exceeding three seconds.

In embodiments wherein the mobile computing device 210 is in beacon mode and is emitting an announcing signal continuously or periodically, the authentication component 238 of the server 214 simply receives the emitted signal. If, however, the mobile computing device 210 is not continuously or periodically emitting an announcing signal, upon receipt of the identifying characteristic of the registered user (e.g., the user name), the authentication component 238 of the server 214 transmits a push notification to the mobile device 210 where it is received by the authentication component 242 thereof. In response, the authentication component 242 of the mobile device 210 transmits the device authentication credential(s) associated therewith to the authentication component 224 of the second computing device 212 (that is, the device from which the registered user is seeking access to the secure service or app). The authentication component 224 of the second computing device 212 then transmits the device authentication credential(s) to the authentication component 238 of the server 214 where verification of the mobile device 210 as associated with the registered user is performed.

In the event the mobile device 210 is verified as being associated with the registered user, such is transmitted from the authentication component 238 of the server 214 to the verification component 227 of the second computing device 212 and first factor authentication (that is, input of the registered user password, or the like) is performed (e.g., utilizing the authentication component 224 of the second computing device 212). If authenticated, the user is permitted access to the desired secure service or app, for instance, by the access permitting component 230 of the second computing device 212.

In the second scenario referred to herein above (wherein access to a desired secure service or app is initiated via a client device from which the user desires to access the secure service or app (e.g., the second computing device 212)), an authentication request is issued by the authentication component 224 of the second computing device 212, the authentication request including at least one identifying characteristic of the user (e.g., a user name). The initiation request is transmitted from the second computing device 212 to the server 214 wherein it is received by the authentication component 238. Just as the mobile device 210 may be in beacon mode and continuously or periodically emitting an announcing signal, the mobile device 210 in such mode also may be continuously or periodically listening or being ready to receive a signal emitted by another computing device. In embodiments wherein the mobile computing device 210 is in beacon mode, the authentication component 238 of the server 214 takes no action with respect to the mobile device 210. However, in embodiments wherein the mobile computing device 210 is not in beacon mode, the authentication component 238 of the server 214 transmits a push notification to the mobile device 210 to alert it to be ready to receive a signal transmission. The push notification is received by the authentication component 242 of the mobile device 210.

The authentication component 238 of the server 214 also transmits device authentication credential(s) associated with the mobile device 210 to the authentication component 224 of the second computing device 212 (that is, the device from which the registered user is seeking access to the secure service or app). The authentication component 224 of the second computing device 212 then transmits the device authentication credential(s) to the authentication component 242 of the first computing device 210 and the authentication component 242 of the mobile computing device 210 transmits the device authentication credential(s) to the authentication component 238 of the server 214 where verification of the mobile device 210 as associated with the registered user is performed.

In the event the mobile device 210 is verified as being associated with the registered user, such is transmitted from the authentication component 238 of the server 214 to the verification component 227 of the second computing device 212 and first factor authentication (that is, input of the registered user password, or the like) is performed (e.g., utilizing the authentication component 224 of the second computing device 212). If authenticated, the user is permitted access to the desired secure service or app, for instance, by the access permitting component 230 of the second computing device 212.

In accordance with embodiments hereof, after a successful login of a registered user to a desired secure service or app, the mobile device 210 and the second computing device 212 may maintain an open connection wherein presence is continuously or periodically detected. If a distance between the mobile computing device 210 and the second computing device 212 (as measured by the distance detecting component 226 of the second computing device 212 of FIG. 2) is within a threshold distance, login and access may be maintained. However, if a distance between the mobile computing device 210 and the second computing device 212 is measured that exceeds the threshold distance, access may be ceased. In this way, the service or app is less vulnerable to opportunistic fraudulent users that attempt to access the secure service or app using the registered user's authentication credentials, for instance, when the user steps away without shutting down or otherwise rendering dormant, the service or app.

The distance detecting component 226 can use multiple techniques to determine the distance between the mobile device 210 and the second computing device 212. In one aspect, a location of each device is determined and then a distance between devices is calculated. The locations of each device may be determined using a suitable computing-device location-detection technology. For instance, location may be determined based on a GPS sensor (or GPS-provided data) associated with each device, Wi-Fi positioning system (WPS) which may include a received signal strength indication (RSSI), fingerprinting, angle of arrival, time or flight, or other localization techniques, wireless-triangulation, geo-location of an IP address, or a combination of these. In some embodiments the threshold distance may vary according to the accuracy and/or resolution of the particular location-detection technology. Each device may provide its location information (or the location may be interrogated from the device, for instance, by a monitoring program). The distance between the locations is then determined and compared to the threshold distance.

According to a second approach, the mobile device 210 and the second computing device 212 are determined to be within proximity if they are both within proximity of another location. For instance, in a first example, the mobile device 210 and the second computing device 212 are determined to be within proximity of each other when both devices are connected to (or are able to detect) the same location area network. For example, where the mobile device 210 and the second computing device 212 are connected to the same wireless access point (WAP), or where the mobile device 210 and the second computing device 212 both detect the same WAP. In one aspect, the mobile device 210 and the second computing device 212 may be polled by a monitoring computer service or computer application (which may be running on the mobile device 210 and/or the second computing device 212) or online/in the cloud. The monitoring service or application may interrogate the mobile device 210 and the second computing device 212 regarding detected wireless communication networks, and determine that the mobile device 210 and the second computing device 212 are in proximity if at least a subset of the same wireless communication networks are detected. The monitoring service or application may poll the devices continuously, periodically, or as needed. In another embodiment, a computing program operating on a network monitors which devices are wirelessly connected to the network. So long as the mobile device 210 and the second computing device 212 are wirelessly connected to the network, then the proximity of the mobile device 210 and the second computing device 212 is limited by the range of the wireless network, and thus the mobile device 210 and the second computing device 212 are within this proximity (the range of the wireless network) of each other.

In a third approach, a relative location of the mobile device 210 with respect to the second computing device 212 may be determined. For instance, the mobile device 210 or the second computing device 212 may communicate an indication of its presence directly with the other device. In one embodiment, a communication session is established between the mobile device 210 and the second computing device 212 using a wireless communication technology, such as Bluetooth, Wi-Fi, Wireless USB/Ultrawideband, near-field communication (NFC), WiMax, etc. An indication of device presence is then communicated between the mobile device 210 and the second computing device 212; for example, the mobile computing device 210 may communicate a device ID (or other identification) to the second computing device 212 over the communication session. In another embodiment, the mobile computing device 210 broadcasts a beacon identifying itself to the second computing device 212 over one of the wireless communication technologies. The specific communication technology utilized may be determined based on the technical capability of the mobile device 210 and the second computing device 212 (i.e., whether the devices are capable of communicating over a particular wireless communication technology) and based on the threshold distance. In particular, NFC has a much shorter range than Wi-Fi, so an implementation using NFC would have a much shorter threshold distance. Additionally, the communication session may occur (or the beacon may be emitted) periodically or as needed. Upon receiving the communicated device presence information (or detecting the beacon), then the receiving device determines that the other device is present and within proximity.

Figure 3:
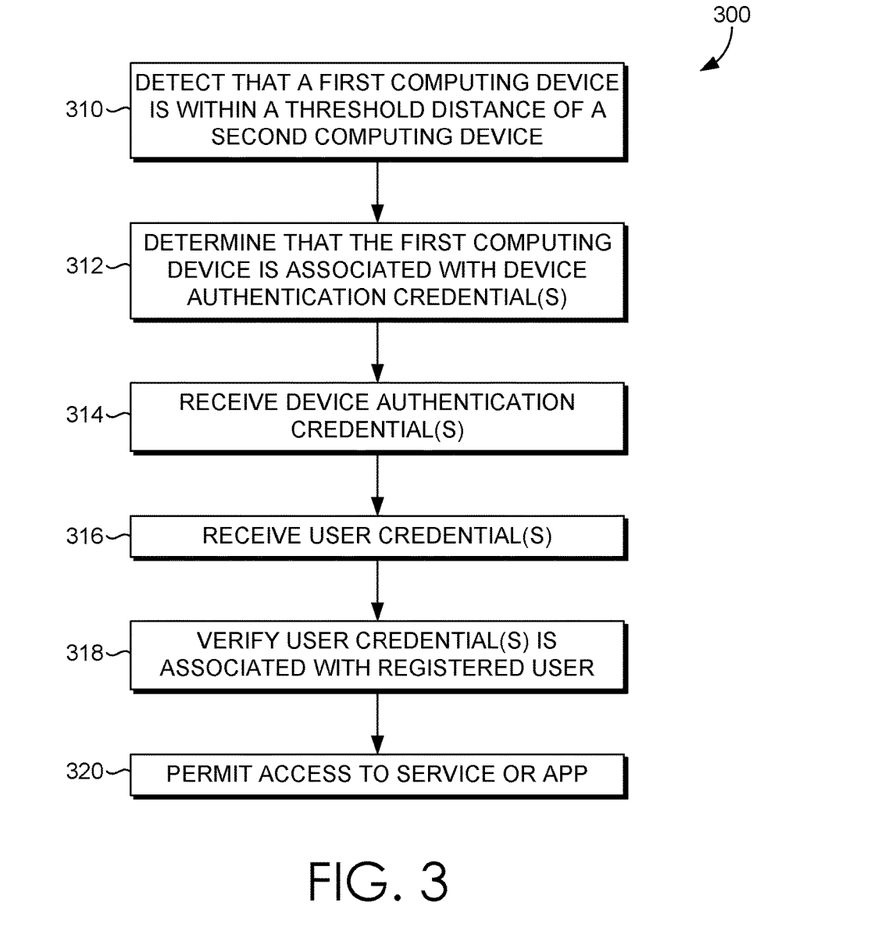
FIG. 3 is a flow diagram depicting a method for providing reversed two-factor authentication, in accordance with an aspect of the technology described herein.

Turning now to FIG. 3, an exemplary flow diagram is illustrated depicting a method 300 for providing reversed two-factor authentication, in accordance with an aspect of the present technology. As indicated at block 310, it is detected (for instance, utilizing the distance detecting component 226 of the second user computing device 212 of the system 200 of FIG. 2) that a first computing device (e.g., a mobile computing device) is within a threshold distance of a second computing device (e.g., a client computing device), the second computing device including a service or app for which authentication is required. As indicated at block 312, it is determined that the first computing device is associated with at least one device authentication credential. Such device authentication credential indicates that the first computing device was utilized by a registered user upon registering for access to the service or app.

As indicated at block 314, the at least one device authentication credential is received, for instance, by the authentication component 224 of the second computing device 212 of the system 200 of FIG. 2. After receiving the at least one device authentication credential, at least one user credential associated with a user of the second computing device is received, for instance by the authentication component 224 of the second computing device 212 of the system 200 of FIG. 2. This is indicated at block 316. In exemplary embodiments of the present technology, the user is prompted to input the at least one user credential after the at least one device authentication credential is received.

As indicated at block 318, it is verified (e.g., utilizing the verification component 228 of the second computing device 212 of the system 200 of FIG. 2) that the at least one user credential is associated with the registered user. As indicated at block 320, the user of the second computing device is permitted to access the service or app, for instance, utilizing the access permitting component 230 of the second computing device 212 of the system 200 of FIG. 2.

Figure 4:
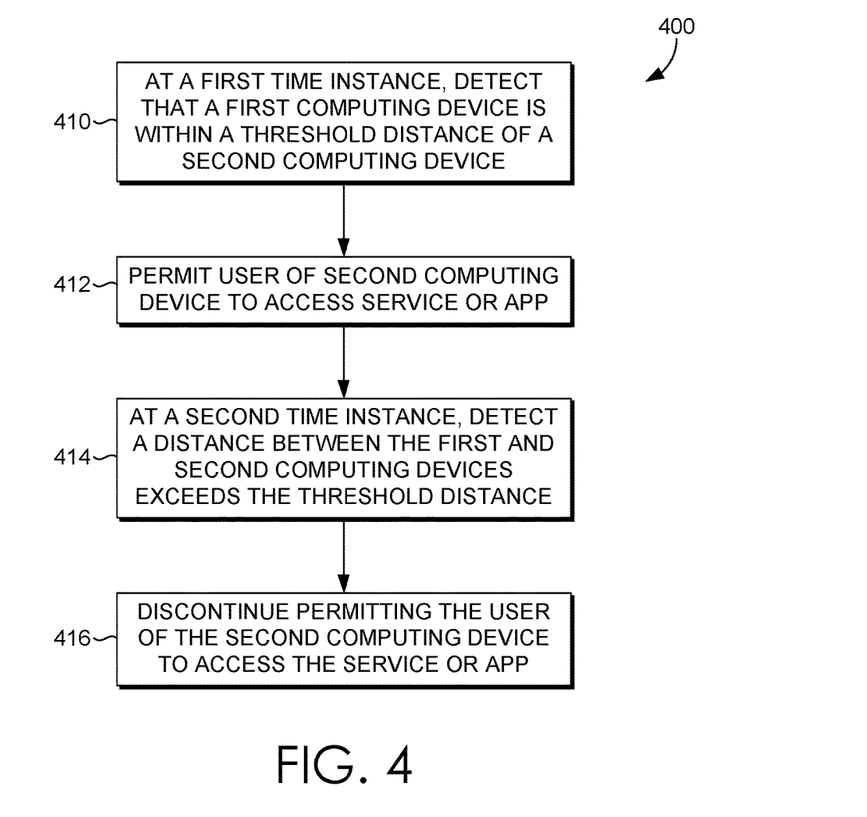
FIG. 4 is a flow diagram depicting a method for providing continuous two-factor authentication, in accordance with an aspect of the technology described herein.

With reference now to FIG. 4, an exemplary flow diagram is illustrated depicting a method 400 for providing continuous two-factor authentication, and permitting access to a secure service or app so long as a first computing device and a second computing device are within a threshold distance of one another, in accordance with an aspect of the technology described herein. As indicated at block 410, at a first time instance, it is detected (e.g., utilizing the distance detecting component 226 of the second computing device 212 of the system 200 of FIG. 2) that a first computing device is within a threshold distance of a second computing device, the second computing device including a secure service or app for which authentication is required for access. As indicated at block 412, while the first and second computing devices are still within the threshold distance of one another (and generally after being authenticated to the service or app), a user that utilized the first computing device during his or her registration with the secure service or app is permitted to access the secure service or app via the second computing device.

As indicated at block 414, at a second time instance, a distance between the first computing device and the second computing device is detected that exceeds the threshold distance (e.g., utilizing the distance detecting component 226 of the second computing device 212 of the system 200 of FIG. 2). In exemplary use scenarios, such would indicate that the registered user that had been permitted access to the secure service or app, and his or her mobile device, are no longer within threshold proximity of the second computing device. As indicated at block 416, based upon the detected distance threshold between the first and second computing devices being exceeded, the user's permission to access the secure service or app associated with the second computing device is discontinued (for instance, utilizing the access permitting component 230 of the second computing device 212 of the system 200 of FIG. 2).

Figure 5:
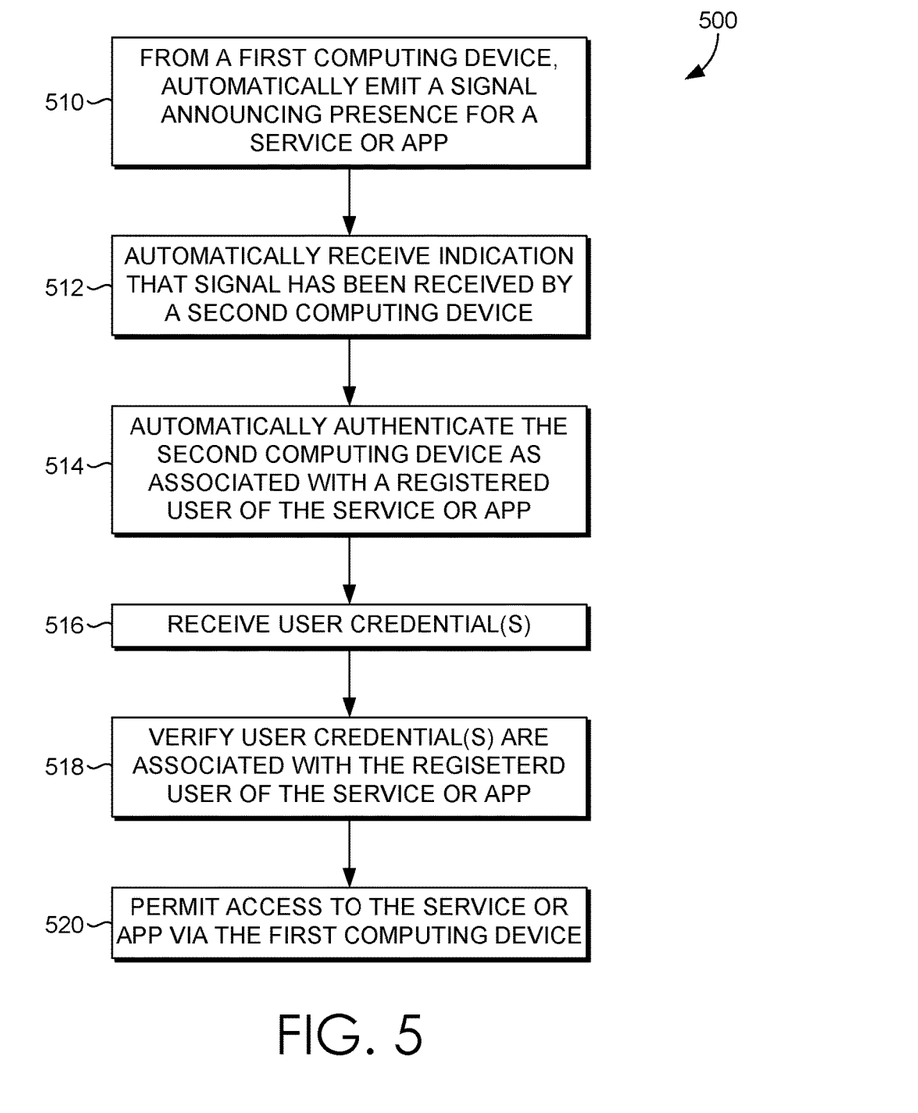
FIG. 5 is a flow diagram depicting a method for providing hands-free two-factor authentication, in accordance with an aspect of the technology described herein.

With reference to FIG. 5, an exemplary flow diagram is illustrated depicting a method 500 for providing hands-free two-factor authentication, in accordance with an aspect of the technology described herein. As indicated at block 510, automatically and without user intervention, a signal (e.g., an audio signal, a Bluetooth® signal, a Wi-Fi® signal, or the like) is emitted from a first computing device (e.g., the second computing device 212 of the system 200 of FIG. 2), the emitted signal announcing presence and availability of a secure service or app for which authentication is required. In exemplary embodiments, the signal may also (or instead) announce presence and serve as an inquiry about secure services or apps available via proximate computing devices. Any and all such variations, and any combination thereof, are contemplated to be within the scope of embodiments of the present technology.

Automatically and without user intervention, an indication is received (e.g., by the distance detecting component 226 of the system 200 of FIG. 2) that the signal has been received by a second computing device (e.g., the first computing device 210 of the system 200 of FIG. 2). This is indicated at block 512. As indicated at block 514, automatically and without user intervention, the second computing device is authenticated as being associated with a registered user of the secure service or app, for instance by the authentication component 224 of the second computing device 212 of the system 200 of FIG. 2. After authenticating the second computing device, at least one device authentication credential is received, for instance by the authentication component 224 of the second computing device 212 of the system 200 of FIG. 2. In exemplary embodiments of the present technology, the user is prompted to input the at least one user credential after the second computing device is authenticated. As indicated at block 518, it is verified (e.g., utilizing the verification component 228 of the system 200 of FIG. 2) that the at least one user credential is associated with the registered user of the service or app. As indicated at block 520, the registered user is permitted access to the service or app via the first computing device, for instance utilizing the access permitting component 230 of the system 200 of FIG. 2.

As can be understood, embodiments of the present technology provide systems, methods, and computer-readable storage media for, among other things, authenticating a user to a service or app utilizing reversed, hands-free and/or continuous two-factor authentication. The present technology has been described in relation to particular embodiments, which are intended in all respects to be illustrative rather than restrictive. Alternative embodiments will become apparent to those of ordinary skill in the art to which the present technology pertains without departing from its scope.

While the technology is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the technology.

It will be understood and appreciated by those having ordinary skill in the art that the above description is merely exemplary and is not meant to limit the scope of embodiments of the subject technology in any way. The description is offered merely to enhance the reader's understanding of various aspects that may be incorporated into systems and methods in accordance with the technology described herein.

While specific elements and steps are discussed in connection to one another, it is understood that any element and/or steps provided herein is contemplated as being combinable with any other elements and/or steps regardless of explicit provision of the same while still being within the scope provided herein. Since many possible aspects may be made of the disclosure without departing from the scope thereof, it is to be understood that all matter herein set forth or shown in the accompanying drawings is to be interpreted as illustrative and not in a limiting sense.

What is claimed is:

1. A reverse two-factor authentication system comprising:
   a processor;
   a computer storage medium comprising computer executable instructions embodied thereon that when executed by the processor configure the system to:
   detect, at a first time instance, that a first computing device is within a threshold distance of a second computing device, the second computing device including a service or app for which authentication is required, wherein the first computing device is detected within the threshold distance of the second computing device automatically and without user intervention;
   determine, automatically and without user intervention, that the first computing device is associated with at least one device authentication credential indicating that the first computing device was utilized by a registered user upon registering for access to the service or app, wherein the at least one device authentication credential including a code received by the registered user of the service or app and one or more identifying details associated with the first computing device used when registering the registered user with the service or app;
   after determining that the first computing device is associated with at least one device authentication credential, receive, automatically and without user intervention, the at least one device authentication credential;
   after receiving the at least one device authentication credential, receive at least one user credential associated with a user of the second computing device;
   verify, at the second computing device, that the at least one user credential is associated with the registered user; and responsive to verifying that the at least one user credential is associated with the registered user, permit the user of the second computing device to access the service or app.

2. The system of claim 1, further configured to generate a prompt for the user of the second computing device to input the at least one user credential after receiving the at least one device authentication credential.

3. The system of claim 1, wherein at least one of the first computing device and the second computing device continuously or periodically emits a signal for detection by other computing devices.

4. The system of claim 3, wherein the signal comprises at least one of an audio signal, a Bluetooth signal and a Wi-Fi signal.

5. The system of claim 1, further configured to:
detect, at a second time instance, a distance between the first computing device and the second computing device that exceeds the threshold distance,
and wherein upon detecting that the distance exceeds the threshold distance, discontinue permitting the second computing device to access the service or app.

6. The system of claim 4, wherein the signal is the audio signal, and wherein the audio signal is of a frequency that is not typically audible by the human auditory system.

7. The system of claim 4, wherein the signal is the audio signal, and wherein the audio signal is of a frequency that is typically audible by the human auditory system.

8. One or more computer storage media storing computer-useable instructions that, when used by one or more computing devices, cause the one or more computing devices to perform a hands-free two-factor authentication method, the method comprising:
from a first computing device, automatically and without user intervention, emitting a signal announcing presence for a first service or app for which authentication is required;
automatically and without user intervention, receiving an indication that the signal has been received by a second computing device, wherein receiving the indication that the signal has been received by the second computing device comprises, at a first time instance, detecting that a first distance between the first computing device and the second computing device is within a threshold distance;
automatically and without user intervention, authenticating the second computing device as being associated with a registered user of the service or app by at least determining that the second computing device is associated with at least one device authentication credential indicating that the second computing device was utilized by the registered user upon registering for access to the service or app, wherein the at least one device authentication credential includes a code received by the registered user of the service or app and one or more identifying details associated with the first computing device used when registering the registered user with the service or ape;
after authenticating the second computing device, receiving at least one user credential;
verifying, at the first computing device, that the at least one user credential is associated with the registered user of the service or app; and
responsive to verifying that the at least one user credential is associated with the registered user, permitting the registered user to access the service or app via the first computing device.

9. The one or more computer storage media of claim 8, wherein emitting, from a first computing device, a signal announcing presence for a first service or app for which authentication is required comprises, emitting, from the first computing device a continuous or periodical signal announcing presence for the first service or app for detection by other computing devices.

10. The one or more computer storage media of claim 8, wherein the signal comprises at least one of an audio signal, a Bluetooth signal and a Wi-Fi signal.

11. The one or more computer storage media of claim 8, wherein the method further comprises:
at a second time instance, detecting that a second distance between the first computing device and the second computing device exceeds the threshold distance; and
upon detecting that the second distance between the first computing device and the second computing device exceeds the threshold distance, discontinuing permitting the registered user to access the service or app via the first computing device.

12. The one or more computer storage media of claim 8, wherein receiving the at least one user credential comprises:
after authenticating the second computing device as being associated with the registered user, generating a prompt in association with at least one of the first computing device and the second computing device for the registered user to input the at least one user credential.

13. The one or more computer storage media of claim 10, wherein the signal is the audio signal, and wherein the audio signal is of a frequency that is not typically audible by the human auditory system.

14. A method of hands-free two-factor authentication, comprising:
from a first computing device, automatically and without user intervention, emitting a signal announcing presence for a first service or app for which authentication is required;
automatically and without user intervention, receiving an indication that the signal has been received by a second computing device, wherein receiving the indication that the signal has been received by the second computing device comprises, at a first time instance, detecting that a first distance between the first computing device and the second computing device is within a threshold distance;
automatically and without user intervention, authenticating the second computing device as being associated with a registered user of the service or app by at least determining that the second computing device is associated with at least one device authentication credential indicating that the second computing device was utilized by the registered user upon registering for access to the service or app, wherein the at least one device authentication credential includes a code received by the registered user of the service or app and one or more identifying details associated with the first computing device used when registered the registered user with the service or app;
after authenticating the second computing device, receiving at least one user credential;
verifying, at the first computing device, that the at least one user credential is associated with the registered user of the service or app; and
responsive to verifying that the at least one user credential is associated with the registered user, permitting the registered user to access the service or app via the first computing device.

15. The method of claim 14, wherein emitting, from a first computing device, a signal announcing presence for a first service or app for which authentication is required comprises, emitting, from the first computing device a continuous or periodical signal announcing presence for the first service or app for detection by other computing devices.

16. The method of claim 14, wherein the signal comprises at least one of an audio signal, a Bluetooth signal and a Wi-Fi signal.

17. The method of claim 14, further comprising:
at a second time instance, detecting a second distance between the first computing device and the second computing device exceeds the threshold distance; and
upon detecting that the second distance between the first computing device and the second computing device exceeds the threshold distance, discontinuing permitting the registered user to access the service or app via the first computing device.

18. The method of claim 14, wherein receiving the at least one user credential comprises:
after authenticating the second computing device as being associated with the registered user, generating a prompt in association with at least one of the first computing device and the second computing device for the registered user to input the at least one user credential.

19. The method of claim 16, wherein the signal is the audio signal, and wherein the audio signal is of a frequency that is not typically audible by the human auditory system.

20. The method of claim 16, wherein the signal is the audio signal, and wherein the audio signal is of a frequency that is typically audible by the human auditory system.

* * * * *